US006309787B1

(12) United States Patent
Cheng

(10) Patent No.: US 6,309,787 B1
(45) Date of Patent: Oct. 30, 2001

(54) AGGREGATION PROCESSES

(75) Inventor: Chieh-Min Cheng, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/558,538

(22) Filed: Apr. 26, 2000

(51) Int. Cl.[7] .................................. G03G 9/08; C08J 3/16

(52) U.S. Cl. ................................ 430/137.14; 430/137.17; 523/335

(58) Field of Search ............................. 430/137, 137.14, 430/137.17; 523/335

(56) References Cited

U.S. PATENT DOCUMENTS

| | | | | |
|---|---|---|---|---|
| 3,674,736 | | 7/1972 | Lerman et al. | 260/41 R |
| 4,137,188 | | 1/1979 | Uetake et al. | 252/62.1 P |
| 4,254,201 | * | 3/1981 | Sawai et al. | 430/110 |
| 4,558,108 | | 12/1985 | Alexandru et al. | 526/340 |
| 4,797,339 | | 1/1989 | Maruyama et al. | 430/109 |
| 4,983,488 | | 1/1991 | Tan et al. | 430/137 |
| 4,996,127 | | 2/1991 | Hasegawa et al. | 430/109 |
| 5,066,560 | | 11/1991 | Tan et al. | 430/137 |
| 5,278,020 | | 1/1994 | Grushkin et al. | 430/137 |
| 5,290,654 | | 3/1994 | Sacripante et al. | 430/137 |
| 5,308,734 | | 5/1994 | Sacripante et al. | 430/137 |
| 5,344,738 | | 9/1994 | Kmiecik-Lawrynowicz et al. | 430/137 |
| 5,346,797 | | 9/1994 | Kmiecik-Lawrynowicz et al. | 430/137 |
| 5,348,832 | | 9/1994 | Sacripante et al. | 430/109 |
| 5,364,729 | | 11/1994 | Kmiecik-Lawrynowicz et al. | 430/137 |
| 5,366,841 | | 11/1994 | Patel et al. | 430/137 |
| 5,370,963 | | 12/1994 | Patel et al. | 430/137 |
| 5,403,693 | | 4/1995 | Patel et al. | 430/137 |
| 5,405,728 | | 4/1995 | Hopper et al. | 430/137 |
| 5,418,108 | | 5/1995 | Kmiecik-Lawrynowicz et al. | 430/137 |
| 5,496,676 | | 3/1996 | Croucher et al. | 430/137 |
| 5,501,935 | | 3/1996 | Patel et al. | 430/137 |
| 5,527,658 | | 6/1996 | Hopper et al. | 430/137 |
| 5,561,025 | | 10/1996 | Torres et al. | 430/137 |
| 5,585,215 | | 12/1996 | Ong et al. | 430/107 |
| 5,650,255 | | 7/1997 | Ng et al. | 430/137 |
| 5,650,256 | | 7/1997 | Veregin et al. | 430/137 |
| 5,766,817 | | 6/1998 | Cheng et al. | 430/137 |
| 5,766,818 | | 6/1998 | Smith et al. | 430/137 |
| 5,944,650 | | 8/1999 | Hu et al. | 516/57 |
| 5,965,316 | * | 10/1999 | Kmiecik-Lawrynowicz et al. | 430/137 |

OTHER PUBLICATIONS

Webster's New Riverside University Dictionary. Boston: Houghton Mifflin Co. p. 283. (1984).*

Grant, Roger et al. Grant and Hackh's Chemical Dictionary. New York: McGraw–Hill, Inc. pp. 422 and 451. (1987).*

* cited by examiner

*Primary Examiner*—Christopher RoDee
(74) *Attorney, Agent, or Firm*—E. O. Palazzo

(57) ABSTRACT

A process comprising aggregating a colorant encapsulated polymer particle containing a colorant with colorant particles and wherein said colorant encapsulated latex is generated by a miniemulsion polymerization.

27 Claims, No Drawings

AGGREGATION PROCESSES

PENDING APPLICATIONS AND PATENTS

Illustrated in U.S. Ser. No. 09/557,830, filed concurrently herewith, the disclosure of which is totally incorporated herein by reference is a process for the preparation of an encapsulated colorant comprising for example, the emulsion polymerization of a miniemulsion of monomer, colorant, ionic surfactant, cosurfactant, and optional nonionic surfactant, wherein the resulting encapsulated colorant containing a polymer shell is of a diameter of, for example, from about 100 to about 1,000 nanometers.

Illustrated in U.S. Ser. No. 08/959,798, pending entitled "Toner Processes", the disclosure of which is totally incorporated herein by reference, is a process for the preparation of toner comprising (i) aggregating a colorant dispersion containing a suitable surfactant with a latex emulsion containing an anionic surfactant, a nonionic surfactant, and a water miscible chain transfer agent, or a nonionic surfactant with chain transfer characteristics to form toner sized aggregates;

(ii) coalescing or fusing the aggregates; and optionally (iii) isolating, washing, and drying the resulting toner.

Illustrated in U.S. Pat. No. 5,944,650 and U.S. Pat. No. 5,766,818, the disclosures of each patent being totally incorporated herein by reference, are cleavable surfactants and the use thereof in emulsion/aggregation and coalescence toner processes.

In U.S. Pat. No. 5,766,817, the disclosure of which is totally incorporated herein by reference, there is illustrated a process for the preparation of toner comprising (i) aggregating a colorant dispersion with a latex miniemulsion containing polymer, an ionic surfactant, a cosurfactant, and a nonionic surfactant;

(ii) coalescing or fusing the aggregates generated; and optionally (iii) cooling, isolating, washing, and drying the toner, and wherein the polymer in the miniemulsion is of a diameter of from about 50 to about 500 nanometers. The miniemulsion processes of this patent may be selected for the preparation of the encapsulated colorants of the present invention.

The appropriate components and process aspects of the above copending applications and patents may be selected for the present invention in embodiments thereof.

BACKGROUND OF THE INVENTION

The present invention is generally directed to colorant and toner processes, and more specifically, to processes which utilize aggregation and coalescence, or fusion of a latex, colorant, such as pigment, dye, or mixtures thereof, and optional additive particles. In embodiments, the present invention is directed to processes which provide toner compositions with a volume average diameter of from about 1 micron to about 25 microns, and preferably from about 2 microns to about 12 microns, and a narrow particle size distribution of, for example, about 1.10 to about 1.45 as measured by the Coulter Counter method. The resulting toners can be selected for known electrophotographic imaging and printing processes, including digital color processes.

The present invention in aspects thereof is directed to a process for the preparation of toners by mixing polymer encapsulated colorant particles and colorant particles, and more specifically, by blending an aqueous colorant, such as a pigment dispersion containing an ionic surfactant with a miniemulsion latex emulsion comprised of monomer particles, preferably submicron in size, of from, for example, about 100 nanometers to about 1,000 nanometers and preferably from about 200 nanometers to about 600 nanometers in volume average diameter, a nonionic surfactant and an ionic surfactant of opposite charge polarity to that of the ionic surfactant in the colorant dispersion, heating to accomplish polymerization of the monomer, thereafter heating the resulting mixture at, for example, below about the polymer glass transition temperature, and more specifically, from about 35° C. to about 60° C. (Centigrade) to form toner sized aggregates of from about 2 microns to about 20 microns in volume average diameter, and which toner is comprised of polymer, colorants, and optional additive particles, followed by heating the aggregate suspension above about the resin, or polymer glass transition temperature, and more specifically, at, for example, from about 70° C. to about 100° C. to effect coalescence or fusion of the components of the aggregates and to form mechanically stable integral toner particles. The miniemulsion contains, for example, a latex of water, polymer or resin, and colorant, oil, or monomer, water, surfactants, and preferably a cosurfactant, such as an alcohol, an alkane, an ether, an alcohol ester, an amine, a halide, or a carboxylic acid ester, which cosurfactant is preferably inert, nonvolatile, water insoluble, and is a liquid at a temperature of, for example, from about 40° C. to about 90° C., and contains a terminal aliphatic hydrocarbyl group with at least about 10 carbon atoms, and more specifically, from about 12 to about 24 carbon atoms, and mixtures thereof, and more specifically, an aliphatic alcohol with at least about 8 carbon atoms, such as from about 10 to about 25 carbon atoms, and an alkane with from about 10 to about 30 carbon atoms. The cosurfactant primarily functions to reduce the diffusion of monomer out of the monomer droplet and enables relatively stable miniemulsions since, it is believed, there is formed intermolecular complexes at the oil/water interface. The complexes are believed to be liquid condensed and electrically charged thus creating a low, for example from about 0.5 dyne/centimeter to about 5 dyne/centimeter interfacial tension and high resistance to droplet coalescence.

With the present invention in embodiments, there is selected a colorant encapsulated with polymer generated by miniemulsion polymerization process. Aggregation/coalescence of these colorant encapsulated polymer particles with colorant particles permit, for example, the generation of a wide range of colored toner compositions with, for example, high colorant loading, narrow particle size distribution, and excellent projection efficiency. Other advantages in embodiments include, for example, (1) better particle dispersion in the resin matrix; (2) improved mechanical properties; (3) protection of the colorant from outside influences during toner processing; and (4) protection of the matrix or toner resin from interaction with the colorant.

The aforementioned toners are especially useful for imaging processes, especially xerographic processes, which usually require high toner transfer efficiency, such as those having a compact machine design without a cleaner, or those that are designed to provide high quality colored images with excellent image resolution, improved signal-to-noise ratio, and image uniformity.

PRIOR ART

There is illustrated in U.S. Pat. No. 4,996,127 a toner of associated particles of secondary particles comprising primary particles of a polymer having acidic, or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation possess diameters suitable for a toner. It is indicated in column 9 of this patent that coagulated particles of 1 to 100, and particularly 3 to 70, are obtained. This process is thus directed to the use of coagulants, such as inorganic magnesium sulfate, which results in the formation of particles with a wide particle size distribution. Similarly, the aforementioned disadvantages, for example poor particle size distributions are obtained hence classification is required resulting in low toner yields, are illustrated in other prior art, such as U.S. Pat. No. 4,797,339, wherein there is disclosed a process for the preparation of toners by resin emulsion polymerization, wherein similar to the '127 patent certain polar resins are selected, and wherein flocculation as in the present invention is not believed to be disclosed; and U.S. Pat. No. 4,558,108, wherein there is disclosed a process for the preparation of a copolymer of styrene and butadiene by specific suspension polymerization.

In U.S. Pat. No. 5,561,025, the disclosure of which is totally incorporated herein by reference, there are illustrated emulsion/aggregation/coalescence processes wherein water phase termination agents, that is chain transfer agents that are not water miscible are selected.

Other prior art that may be of interest includes U.S. Pat. Nos. 3,674,736; 4,137,188 and 5,066,560.

Emulsion/aggregation processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; and 5,650,256.

Processes for the preparation of spherical toners at coalescence temperatures of from about 100° C. to about 120° C. are illustrated in U.S. Pat. No. 5,501,935, the disclosure of which is totally incorporated herein by reference.

The appropriate components and processes of the above patents may be selected for the processes of the present invention in embodiments thereof.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant, especially pigment dispersions, thus enabling the achievement of excellent color print quality, and wherein there is selected encapsulated latex colorants.

A further feature of the present invention is to provide a toner with high projection efficiency, such as from about 80 to about 95, and preferably from about 85 to about 95 percent efficiency as measured by the Match Scan II spectrophotometer available from Milton-Roy, for use in transparencies.

In another feature of the present invention there are provided emulsion aggregated toners with excellent high intensity color resolutions, and which toners possess high light transmission allowing about 80 to 95 percent of the transmitted light passing through a fused image on a transparency to reach the screen from an overhead projector.

Also, in a further feature of the present invention there is provided a process for the preparation of toner compositions with a volume average diameter of from between about 1 to about 20 microns, and preferably from about 2 to about 12 microns, and a particle size distribution of about 1.10 to about 1.35, and preferably from about 1.15 to about 1.25 as measured by a Coulter Counter without the need to resort to conventional classifications to narrow the toner particle size distribution, and wherein there are selected encapsulated colorants.

Moreover, in another feature of the present invention there are provided simple and economical processes for the direct preparation of a wide range of colored toner compositions with, for example, excellent projection efficiency and narrow GSD.

In a further feature of the present invention there is provided a process for the preparation of toner by aggregation and coalescence, or fusion (aggregation/coalescence) of latex, colorants, and additive particles, and wherein the latex is a miniemulsion, and there is included therein colorant, a cosurfactant, or a hydrotrope, small water soluble molecules with minimum surface activity, such as sodium xylene sulfonate or sodium toluene sulfonate, which can be selected to enhance latex polymer stability and reduce the amount of undesirable sediment, and wherein there results an encapsulated colorant dispersion that can be aggregated with colorant particles.

In yet another feature of the present invention there are provided toner compositions with low fusing temperatures of from about 120° C. to about 180° C., and which toner compositions exhibit excellent blocking characteristics at and above about 45° C., and wherein there are selected encapsulated colorants.

These and other features of the present invention are accomplished in embodiments by the provision of toners and processes thereof. In embodiments of the present invention, there are provided sediment free, or substantially sediment free processes for the preparation of toner compositions by the aggregation/coalescence of latex, colorant and encapsulated colorant, such as pigment particles in the presence of a cosurfactant, and wherein the temperature of the aggregation may be selected to control the aggregate size, and thus the final toner particle size, and the coalescence temperature and time may be utilized to control the toner shape and surface properties.

Aspects of the present invention relate to a process comprising aggregating an encapsulated colorant with colorant particles, and wherein the encapsulated colorant is generated by a miniemulsion polymerization; a process wherein the encapsulated colorant is generated by the emulsion polymerization of a colorant and a monomer, wherein a miniemulsion of the monomer is generated, and wherein the miniemulsion contains subsequent to polymerization a colorant core and a polymer shell, and which miniemulsion is generated in the presence of an ionic surfactant, a cosurfactant, and a nonionic surfactant, and wherein the monomer in the miniemulsion is of a diameter of from about 100 to about 1,000 nanometers; and wherein the colorant is encapsulated in the polymer generated by the polymerization; a process wherein the aggregating is accomplished below about the polymer glass transition temperature followed by coalescing, and wherein the coalescing or fusing of the aggregates is accomplished above about the polymer glass transition temperature, and wherein the monomer diameter is from about 200 to about 600 nanometers, and there results a toner with a size of from about 2 to about 25 microns in volume average diameter; a process wherein the temperature below the glass transition temperature is from about 25° C. to about 60° C., and the heating above the glass transition temperature is from about 60° C. to about 100° C.; a process wherein the temperature below the polymer glass transition temperature is from about 35° C. to about 55° C., and the temperature above the polymer glass transition temperature is from about 70° C. to about 95° C.; a process wherein the temperature at which the aggregation is accomplished controls the size of the aggregates, and wherein the final toner size is from about 2 to about 10 microns in volume average diameter, and wherein the temperature and time of the coalescence or fusion of the components of aggregates control the shape of the resultant toner; a process wherein the aggregation temperature is from about 20° C. to about 55° C., and wherein the coalescence or fusion temperature is from about 80° C. to about 95° C.; a process wherein the cosurfactant is an alkane with from about 10 to about 24 carbon atoms, and wherein the alkane is present in an amount of from about 0.05 to about 5 parts, or percent by weight; a process wherein the cosurfactant is an alcohol, or an alkyl thiol; a process wherein the alcohol contains from about 10 to about 20 carbon atoms; a process wherein the alcohol is decanol, lauryl alcohol, tetradecanol, cetyl alcohol, stearyl alcohol, or octadecanol; a process wherein the alcohol is present in an amount of from about 0.1 to about 5 parts, or weight percent; a process wherein the alkane is n-decane, dodecane, tetradecane, hexadecane, octadecane octyne, dodecyl cyclohexane, or hexadecyl benzene; a process wherein the colorant is a pigment, and wherein the pigment dispersion contains an ionic surfactant, and the miniemulsion is a latex containing a nonionic surfactant and an ionic surfactant of opposite charge polarity to that of the ionic surfactant present in a pigment dispersion, and wherein the colorant particles are comprised of pigment particles; a process wherein the surfactant utilized in the colorant dispersion is a cationic surfactant, and the ionic surfactant present in the latex mixture is an anionic surfactant; a process wherein the aggregation is accomplished at a temperature of from about 35° C. to about 1° C. below the Tg of the latex polymer, or latex resin for a duration of from about 0.5 hour to about 3 hours; a process wherein the coalescence or fusion of the components of aggregates for the formation of integral toner particles comprised of encapsulated colorant and colorant particles is accomplished at a temperature of about 85° C. to about 105° C. for a duration of from about 1 hour to about 5 hours; a process wherein the polymer shell or coating is selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly (styrene-alkyl acrylate-acrylonitrile-acrylic acid), poly (styrene-1,3-diene-acrylonitrile-acrylic acid), poly(alkyl acrylate-acrylonitrile-acrylic acid), poly(alkyl methacrylate-2-carboxyethyl acrylate), poly(styrene-alkyl acrylate-2-carboxyethyl acrylate), poly(styrene-alkyl acrylate-acrylonitrile-2-carboxyethyl acrylate), poly(styrene-1,3-diene-acrylonitrile-2-carboxyethyl acrylate), and poly(alkyl acrylate-acrylonitrile-2-carboxyethyl acrylate); and wherein the polymer is optionally present in an amount of from about 35 percent by weight to about 99 percent by weight of toner; a process wherein the miniemulsion monomer is a latex, and wherein subsequent to polymerization by heating there results a polymer selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), and poly(butyl acrylate-isoprene); poly(styrene-propyl acrylate), poly(styrene-butyl acrylate), poly(styrene-butadiene-acrylic acid), poly (styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly (styrene-butadiene-2-carboxyethyl acrylate), poly(styrene-butadiene-acrylonitrile-2-carboxyethyl acrylate), poly (styrene-butyl acrylate-2-carboxyethyl acrylate), and poly (styrene-butyl acrylate-acrylonitrile-2-carboxyethyl acrylate); a process wherein the ionic surfactant is an anionic surfactant selected from the group consisting of sodium dodecyl sulfate, sodium dodecylbenzene sulfate, sodium dodecylnaphthalene sulfate, and sodium tetrapropyl diphenyloxide disulfonate, and wherein the colorant core is a dispersion containing a cationic surfactant of a quaternary ammonium salt; a process wherein the encapsulated colorant and the colorant particles are carbon black, magnetite, cyan, yellow, magenta, and mixtures thereof; a process wherein the toner particles isolated are from about 2 to about 12 microns in volume average diameter, and the particle size distribution thereof is from about 1.15 to about 1.30, wherein each of the surfactants utilized represents from about 0.01 to about 5 weight percent of the total reaction mixture, and wherein there is added to the surface of the formed toner metal salts, metal salts of fatty acids, silicas, metal oxides, or mixtures thereof, each in an amount of from about 0.1 to about 10 weight percent of the obtained toner particles; a process wherein the monomer in the miniemulsion is of a diameter of from about 200 to about 600 nanometers; a process for the preparation of toner which comprises aggregating colorant particles and an encapsulated colorant containing a polymer shell, an ionic surfactant, a cosurfactant, and a nonionic surfactant;

coalescing the aggregates generated; and optionally isolating, washing, and drying the toner; a process wherein the isolating washing and drying are accomplished; a process wherein the alkyl thiol contains from about 10 to about 18 carbon atoms; a process wherein the alkyl thiol is decanethiol, 1-dodecanethiol, t-dodecanethiol, or octadecanethiol, and the like; a process wherein the polymer formed by polymerization of the monomer present in the minimization is poly (styrene-alkyl acrylate-acrylic acid), poly(styrene-1,3-diene-acrylic acid), or poly(styrene-alkyl acrylate-2-carboxyethyl acrylate); a process wherein the polymer is poly(styrene-butyl acrylate-acrylic acid), poly (styrene-butyl acrylate-2-carboxyethyl acrylate), or poly(styrene-butadiene-acrylic acid); a process wherein the cosurfactant is selected from the group consisting of alkanes, hydrocarbyl alcohols, ethers, alkyl thiols, amines, halides, and esters, and the like; a process wherein the encapsulated colorant and colorant particles are dissimilar; a process wherein the encapsulated colorant and colorant particles are similar; a process comprising aggregating an encapsulated colorant with colorant particles and wherein the encapsulated colorant is generated by a miniemulsion polymerization, and wherein the polymerization is accomplished in the presence of a cosurfactant; a process wherein the cosurfactant is present in an amount of from about 0.1 to about 10 weight percent; a process wherein the cosurfactant is present in an amount of from about 1 to about 3 weight percent; a process comprising forming a latex emulsion containing a monomer and colorant, polymerizing resulting in an encapsulated colorant, and mixing the encapsulated colorant with colorant; a process wherein the latex contains water; a process wherein the encapsulated colorant is comprised of a colorant core and a polymer coating; a process for the preparation of a colorant encapsulated completely or incompletely with polymer comprising the polymerization of monomer in the presence of chain transfer agent, initiators, and colorant, and thereafter mixing the encapsulated colorant with colorant particles. The colorant encapsulated latex polymer can be prepared by a free radical-initiated aqueous miniemulsion polymerization of a mixture of from about 1 to about 10 monomers, and preferably from about 2 to about 5 monomers, such as olefinic monomers, free radical initiator, chain transfer agent, surfactant, cosurfactant, and water, wherein the amount of monomers selected is, for example, from about 1 to about 40 weight percent, and the amount of water is from about 59 to about 98 weight percent, based on the total reaction mixture amount by heating at, for example, temperatures of between about 45° C. to about 90° C., wherein the resulting latex polymer possesses, for example, a number average molecular weight of from about 1,000 grams per mole to about 200,000 grams per mole, and a weight average molecular weight of from about 5,000 grams per mole to about 500,000 grams per mole, and a glass temperature of from 40° C. to about 120° C. The colorants selected may be present in various effective amounts, such as from about 1 to about 25, and preferably from about 2 to about 14 weight percent based on the total monomer or monomers used to prepare the polymer resin. The free radical initiator is selected in amounts of, for example, from about 0.1 to about 10 weight percent based on the total monomer or monomers used to prepare the polymer resin. Chain transfer agents are selected in amounts of from about 0.5 to about 10 weight percent based on the total monomer or monomers selected to prepare the polymer resin. Surfactants are selected in amounts of from about 0.1 to about 10 weight percent based on the total monomer or monomers selected to prepare the polymer resin. Cosurfactant, when present, is selected in various suitable amounts, such as, for example, from about 0.005 to about 5, and preferably from about 0.5 to about 3 weight percent, based on the total monomer or monomers used to prepare the polymer resin. The latex polymer emulsion is preferably comprised of from about 1 to about 40 weight percent of polymer particles, of average diameter of from about 100 nanometers to about 1,000 nanometers, as measured by light scattering technique on a Coulter N4 Plus Particle Sizer.

With the present invention in embodiments, there is selected a colorant encapsulated by a polymer preferably generated by a semicontinuous, miniemulsion polymerization process, subsequently admixing with colorant followed by aggregation/coalescence of the colorant encapsulated polymer to enable toners with at least four different colors of cyan, yellow, magenta, and black with uniform tribocharging wherein the difference in tribocharging among the different four color toners is, for example, less than about 10 $\mu$C/gram, and preferably less than about 5 $\mu$C/gram, such as from about 1 to about 5.

Embodiments of the present invention include a process for the preparation of toner comprising (i) aggregating a polymer encapsulated colorant or a colorant encapsulated polymer miniemulsion containing colorant, polymer, an ionic surfactant, a cosurfactant, and a nonionic surfactant, with a colorant dispersion;

(ii) coalescing or fusing the aggregates generated; and (iii) cooling, isolating, washing, and drying the toner, and wherein the monomer in the miniemulsion is of a diameter of from about 100 to about 1,000 nanometers; a process wherein the aggregating is below about the polymer shell glass transition temperature present in the colorant encapsulated latex emulsion, the coalescing or fusing of the aggregates is above about the polymer glass transition temperature, and wherein the colorant encapsulated polymer particle diameter is from about 200 to about 600 nanometers, and there results toner with a size of from about 2 to about 20 microns in volume average diameter; wherein the temperature below the polymer glass transition temperature is from about 25° C. to about 60° C., and the heating above the glass transition temperature is from about 60° C. to about 100° C.; a process wherein the temperature below the polymer glass transition temperature is from about 35° C. to about 60° C., and the heating above the glass transition temperature is from about 65° C. to about 95° C.; a process wherein the temperature at which the aggregation is accomplished controls the size of the aggregates, and wherein the final toner size is from about 2 to about 12 microns in volume average diameter, and wherein the temperature and time of the coalescence or fusion of the components of aggregates control the shape, such as spherical, of the resultant toner; a process wherein the aggregation temperature is from about 20° C. to about 55° C., and wherein the coalescence or fusion temperature is from about 75° C. to about 95° C.; a process wherein the colorant is a pigment or a dye, and wherein the pigment or a dye dispersion contains an ionic surfactant, and the minilatex emulsion contains a nonionic surfactant and an ionic surfactant of opposite charge polarity to that of ionic surfactant present in the pigment or dye dispersion; a process wherein the surfactant utilized in the colorant dispersion is a cationic surfactant, and the ionic surfactant present in the latex mixture is an anionic surfactant; a process wherein the aggregation is accomplished at a temperature of from about 15° C. to about 1° C. below the Tg of the latex polymer, or latex resin for a duration of from about 0.5 hour to about 4 hours; a process wherein the coalescence or fusion of the components of aggregates for the formation of integral toner particles comprised of colorant, resin and optional known toner additives is accomplished at a temperature of about 85° C. to about 105° C. for a duration of from about 1 hour to about 5 hours; a process wherein there is formed from the latex monomer a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(styrene-alkyl acrylate-2-carboxyethyl acrylate), poly(styrene-1,3-diene-2-carboxyethyl acrylate), poly(styrene-alkyl methacrylate-2-carboxyethyl acrylate), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(alkyl methacrylate-2-carboxyethyl acrylate), poly(styrene-alkyl acrylate-acrylonitrile-2-carboxyethyl acrylate), poly(styrene-1,3-diene-acrylonitrile-2-carboxyethyl acrylate), and poly(alkyl acrylate-acrylonitrile-2-carboxyethyl acrylate), and wherein the polymer is present in an amount of from about 35 percent by weight to about 99 percent by weight of toner, and wherein the colorant is a pigment; a process wherein the polymer formed by polymerization of the latex monomer is selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene-2-carboxyethyl acrylate), poly(styrene-butadiene-acrylonitrile-2carboxyethyl acrylate), poly(styrene-butyl acrylate-2-carboxyethyl acrylate), poly(styrene-butyl acrylate-acrylonitrile-2-carboxyethyl acrylate), and the like, and wherein the polymer is optionally present in an amount of from 60 percent by weight to about 95 percent by weight of toner, and wherein the colorant is a pigment; a process wherein the anionic surfactant is selected from the group consisting of sodium dodecyl sulfate, sodium dodecylbenzene sulfate, sodium dodecylnaphthalene sulfate, and sodium tetrapropyl diphenyloxide disulfonate, and wherein the colorant dispersion contains a cationic surfactant; a process wherein the colorant is carbon black, magnetite, cyan, yellow, magenta, and mixtures thereof; a process wherein the toner particles isolated are from about 2 to about 12 microns in volume average diameter, and the particle size distribution thereof is from about 1.15 to about 1.30, wherein each of the surfactants utilized represents from about 0.01 to about 10 weight percent of the total reaction mixture, and wherein there is added to the surface of the formed toner metal salts, metal salts of fatty acids, silicas, metal oxides, coated silicas, or mixtures thereof, each in an amount of from about 0.1 to about 10, and preferably from about 1 to about 3 weight percent of the obtained toner particles; a process wherein the polymer in the miniemulsion is of a diameter of from about 100 to about 1,000 nanometers, or wherein the polymer in the miniemulsion is of a diameter of from about 200 to about 600 nanometers; and a process for the preparation of toner which comprises aggregating an encapsulated colorant miniemulsion containing colorant, polymer particles of a diameter of from about 100 to about 1,000 nanometers, an ionic surfactant, a cosurfactant, and a nonionic surfactant;

coalescing the aggregates generated.

With further respect to the present invention, there are generated encapsulated colorant particles by semicontinuous miniemulsion polymerization processes as illustrated herein and wherein the encapsulated colorant particles are mixed with colorant particles, wherein the mixing is preferably accomplished by heating to form aggregates of polymer encapsulated colorant particles and colorant particles, followed by coalescence to enable toners with a high colorant loading of, for example, from about 10 to about 65, and preferably from about 15 to about 45 percent by weight of the toner, and wherein the toner particles can be considered fine, that is for example, from about 2 to about 10 microns in volume average diameter.

In specific embodiments thereof, the present invention relates to a direct toner preparative process comprised of blending aqueous latex colorant dispersion containing, for example, monomer, a pigment, such as HELIOGEN BLUE™ or HOSTAPERM PINK™, and a cationic surfactant, such as benzalkonium chloride (SANIZOL B-50™), and wherein the latex miniemulsion contains an anionic surfactant, such as sodium dodecylbenzene sulfonate (for example NEOGEN R™ or NEOGEN SC™), sodium tetrapropyl diphenyloxide disulfonate (for example DOWFAX 2A1™) and cosurfactant, and wherein the latex polymer is derived from emulsion polymerization of the monomer selected, such as for example, styrene, acrylates, methacrylates, acrylonitrile, butadiene, acrylic acid, methacrylic acid, 2-carboxyethyl acrylate, and the like; mixing with heating to form a polymer shell encapsulating a colorant core; mixing with colorant; thereby resulting in a mixture of encapsulated colorant and colorant, and which mixture, on further stirring at a temperature of from about 35° C. to about 60° C., results in the formation of toner sized aggregates having an aggregate size of from about 2 microns to about 20 microns in volume average diameter as measured by the Coulter Counter (Microsizer II), and a particle size distribution of about 1.15 to about 1.35; thereafter, heating the aggregate suspension at from about 70° C. to about 95° C. to form toner particles; followed by filtration, washing, and drying in an oven, or the like; and processes for the preparation of toner compositions which comprise blending an aqueous encapsulated latex colorant dispersion preferably containing a pigment, such as carbon black, phthalocyanine, quinacridone or RHODAMINE B™ type red, green, brown, and the like with a cationic surfactant, such as benzalkonium chloride, wherein the latex is a minilatex emulsion derived from the emulsion polymerization of monomers selected from the group consisting of styrene, butadiene, acrylates, methacrylates, acrylonitrile, acrylic acid, methacrylic acid, 2-carboxyethyl acrylate, and the like, and which latex contains an anionic surfactant, such as sodium dodecylbenzene sulfonate or sodium tetrapropyl diphenyloxide disulfonate, a nonionic surfactant, and a cosurfactant, and which colorant encapsulated latex resin size is, for example, from about 100 to about 1,000 nanometers, and preferably from about 200 to about 600 nanometers as measured by light scattering technique on a Coulter N4 Plus Particle Sizer; heating the resulting flocculent mixture at a temperature below or about equal to the Tg of the polymer or resin formed in the latex, which heating is, for example, from about 30° C. to about 65° C. for an effective length of time of, for example, 0.5 hour to about 2 hours to form toner sized aggregates; and subsequently heating the aggregate suspension at a temperature at or above the Tg of the latex polymer, for example from about 60° C. to about 100° C., to provide toner particles; and finally isolating the toner product by filtration, thereafter washing and drying in an oven, fluid bed dryer, freeze dryer, or spray dryer; whereby toner particles comprised of polymer, or resin, colorants, and optional toner additives can be obtained.

The polymer shell can be prepared by emulsion polymerization methods, and the monomers utilized in such processes include styrene, acrylates, methacrylates, butadienes, isoprenes, acrylic acids, methacrylic acids, acrylonitriles, and the like. Known chain transfer agents, for example dodecanethiol, about 0.1 to about 10 percent, or carbon tetrabromide in effective amounts, such as from about 0.1 to about 10 percent, can also be utilized to primarily control the molecular weight properties of the polymer when emulsion polymerization is selected. Other processes of obtaining polymer particles of from, for example, about 0.01 micron to about 2 microns can be selected, such as polymer microsuspension process, as disclosed in U.S. Pat. No. 3,674,736, the disclosure of which is totally incorporated herein by reference, polymer solution microsuspension process as disclosed in U.S. Pat No. 5,290,654 the disclosure of which is totally incorporated herein by reference, mechanical grinding processes, or other known processes.

More specifically, with the present invention in embodiments thereof there is selected a semicontinuous, miniemulsion polymerization process to form encapsulated colorants and to form colorant encapsulated polymer particles. Generally, the process of the present invention can be referred to as a miniemulsion polymerization, since the primary colorant particles are dispersed in a monomer or mixture of monomers, with polymerization subsequent to the emulsification. The miniemulsion process generates, for example, a water oil monomer emulsion wherein the amount of oil is from about 0.5 to about 80 weight percent, and preferably from about 5 to about 75 weight percent, and the amount of water is from about 20 to about 99.5 weight percent, and preferably from about 25 to about 95 weight percent, based on the total oil and water mixture. Subsequently, the resulting miniemulsion together with initiator can be continuously added at elevated temperature, for example, temperatures of between about 35° C. to about 120° C., and preferably between about 45° C. to about 90° C. to accomplish the emulsion polymerization. The encapsulation of colorant particles with the miniemulsion polymerization process offers certain advantages over conventional methods such as the direct dispersion of the particles in the oil medium, rather than in the water phase, by using homogenization in the presence of surfactants. Homogenization is selected to provide the shear to generate the miniemulsion with the colorant particles located inside the miniemulsion droplets. The semicontinuous addition of a miniemulsion to a reactor can provide for the excellent stability of the miniemulsion preventing particle coalescence or flocculation among the interactive monomer emulsion droplets, and maintaining particle size in the range of from about 100 to about 1,000 nanometers, and preferably from about 200 to about 600 nanometers, and improved latex stability. The amount of colorant being encapsulated within the polymer is, for example, from about 80 to about 98 percent, based on the total amount of colorant selected for the preparation of the colorant encapsulated polymer particles.

Miniemulsions are, for example, relatively stable submicron, for example, about 100 to about 1,000 nanometers dispersions of oil (monomer) in water prepared by shearing a composition containing monomers, water, initiator, chain transfer agent, surfactant, cosurfactant, and additionally, colorant. A principle involved in the preparation of stable miniemulsion, which stability can be maintained by using a cosurfactant to prevent or minimize particle coalescence or flocculation among the interactive monomer emulsion droplets, is the introduction of a low molecular weight cosurfactant, for example, the $M_W$, of the cosurfactant is not more than about 5,000, preferably not more than about 2,000, and still more preferably from about 100 to about 500, and which cosurfactant is a relatively highly water insoluble to the extent that in water it possesses a solubility of less than about $10^{-3}$ grams, preferably less than about $10^{-4}$ grams, and more preferably from about $10^{-6}$ grams to about $10^{-4}$ grams per liter of water to substantially retard the diffusion of monomer and colorant out of the emulsion droplet. The cosurfactant can be comprised of, for example, a long chain alcohol or alkane of, for example, preferably from about 12 to about 24 carbon atoms in length. The cosurfactant primarily functions to reduce the diffusion of monomer out of the monomer droplet, and more specifically, the cosurfactant can function to reduce the monomer diffusion to an extent of about 75 to about 95 percent to then enable relatively stable miniemulsions because, it is believed, of the formation of intermolecular complexes at the oil/water interface. The enhanced stability of miniemulsions is attributed to the formation of intermolecular complexes at the oil/water interface, which is comprised of solidified bilayers of anionic surfactant and cosurfactant separated by water. The macrostructure of the bilayers is comprised of a tortuous network of irregularly shaped aggregates with diameters between, for example, about 5 to about 100 nanometers. The complexes can be considered liquid condensed (the bilayer network separated by water) and the surface charge (zeta-potential) of the miniemulsions is, for example, from about 50 to about 120 mV, and preferably from about 60 to about 100 mV, as determined by the PenKem System 3000 Electrophoresis, electrically charged creating a low interfacial tension, for example from about 0.5 dyne/centimeter to about 5 dyne/centimeter.

In conventional emulsion polymerization (in the absence of a long chain alcohol or alkane surfactant and/or high shear), the primary mechanisms of particle nucleation are micellar and/or homogeneous nucleation, i.e., the principal locus of particle nucleation is the aqueous phase or the monomer swollen micelles. Monomer droplets (>1,000 nanometers) function as monomer reservoirs supplying monomer to the growing polymer particles. In contrast, miniemulsion polymerizations utilize a surfactant/cosurfactant system to generate small (100 to 1,000 nanometers) monomer droplets. The small droplet size, and consequent large droplet surface area in a miniemulsion results in most of the surfactant being adsorbed to the droplets with little free surfactant available to form micelles. Hence, there may be little or no micellar or homogeneous nucleation, and the droplets become the primary locus of particle nucleation. Particle nucleation in miniemulsion polymerization is predominantly generated from small monomer droplets that are stabilized against Ostwald ripening.

Long chain aliphatic mercaptans, such as dodecyl mercaptan, are commonly used as chain transfer agents to regulate the polymer molecular weight in emulsion polymerization. These surfactants are usually water-insoluble and could be used as hydrophobes to stabilize the miniemulsion droplets against monomer diffusion and colorant leaching. The miniemulsions stabilized with long chain aliphatic mercaptans are thermodynamically stable. These chain transfer agents may also function as cosurfactants.

Examples of ethylenically unsaturated monomers include, for example, vinyl aromatic and aliphatic hydrocarbons such as styrene, a-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene as well as ethylenically unsaturated esters, such as acrylic, methacrylic, cinnamic and crotonic and the like, and esters containing fumaric and maleic type unsaturation, and acid olefinic monomers, such as acrylic acid, methacrylic acid, itaconic acid, fumaric acid, maleic acid, 2-carboxyethyl acrylate, sodium acrylate, potassium acrylate, and the like. Particularly preferred monomers include, for example, styrene, 1,3-butadiene, isoprene, alkyl (meth)acrylates such as ethyl acrylate, butyl acrylate, methyl methacrylate, butyl methacrylate, acrylonitrile, vinyl acetate, acrylic acid, methacrylic acid, and 2-carboxyethyl acrylate.

Examples of the polymers formed from monomers after polymerization are poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), poly(styrene-butadiene-2-carboxyethyl acrylate), poly(styrene-butadiene-acrylonitrile-2-carboxyethyl acrylate), poly(styrene-butyl acrylate-2-carboxyethyl acrylate), and poly(styrene-butyl acrylate-acrylonitrile-2-carboxyethyl acrylate).

The free radical initiator utilized is generally an emulsion type water-soluble initiator, such as a persulfate like potassium, sodium, or ammonium persulfate, or oil-soluble initiators, such as benzyl peroxide, lauroyl peroxide, 2,2'-azobis(isobutyronitrile), or 2,2'-azobis-(2-methylbutyronitrile), or mixtures thereof. The free radical is selected in amounts of, for example, from about 0.1 to about 10 weight percent based on the total monomer or monomers used to prepare the polymer resin. Chain transfer agents selected include, for example, alkylthiol such as 1-dodecanethiol, in an amount of, for example, about 0.5 to about 10 percent on weight, halogenated carbons, such as carbon tetrabromide, about 0.1 to about 10 percent on weight, based on the monomer, or monomers used to prepare the polymer resin, or preferably an alkylthiol.

Cosurfactants include, for example, alkanes, and hydrocarbyl alcohols, ethers, amines, halides and esters, which are for example, inert, nonvolatile, water insoluble, liquids at a temperature of from about 40° C. to about 90° C., and contain a terminal aliphatic hydrocarbyl group, and mixtures thereof. The terminal aliphatic hydrocarbyl group of, for example, at least about 10, and more specifically, from about 10 to about 20 carbon atoms contained therein may be unsaturated, but is preferably saturated, and branched, but is preferably straight chain. The molecular weight $M_W$ of the cosurfactant is, for example, not more than about 5,000, preferably not more than about 2,000, and still more preferably from about 100 to about 500. Examples of specific cosurfactants include alkanes, such as n-decane, n-tetradecane, n-hexadecane, n-octadecane, eicosane, tetracosane, 1-decene, 1-dodecene, 2-hexadecyne, 2-tetradecyne, 3-octyne, 4-octyne, and 1-tetradecene; alicyclic hydrocarbons, such as dodecyl cyclohexane; aromatic hydrocarbons, such as hexadecyl benzene; alcohols, such as decanol, lauryl alcohol, tetradecanol, cetyl alcohol, octadecanol, eicosanol, 1-heptadecanol and ceryl alcohol; hydrocarbyl alcohol esters of lower molecular weight carboxylic acids, such as cetyl acetate; ethers, such as octyl ether and cetyl ether; amines, such as tetradecyl amine, hexadecyl amine, and octadecyl amine; halides, such as hexadecyl chloride and other chlorinated paraffins; hydrocarbyl carboxylic acid esters of lower molecular weight alcohols, such as methyl, ethyl and isoamyl octanoate, methyl and octyl caprate, ethyl stearate, isopropyl myristate, methyl, isoamyl and butyl oleate, glyceryl tristearate, soybean oil, coconut oil, tallow, laurin, myristin, olein and the like. With the processes of the present invention, cosurfactants as illustrated herein are selected, such as preferably cosurfactants of dodecane, hexadecane, lauryl alcohol, or cetyl alcohol, and which cosurfactants are selected in various suitable amounts, such as from about 0.005 to about 5, and preferably from about 0.5 to about 3 weight percent, or parts based on the monomer, or monomers used to prepare the polymer resin.

Various known colorants, such as pigments, present in the toner in a suitable amount of, for example, from about 1 to about 65 percent by weight of toner, and preferably in an amount of from about 2 to about 45 or 2 to about 20, and in embodiments from 2 to about 12 percent by weight, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue, or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, red, brown, orange, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be used include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. Colorants include pigment, dye, mixtures of pigment and dyes, mixtures of pigments, mixtures of dyes, and the like. More specifically, pigment examples include Pigment Blue 15:3 having a Color Index Constitution Number of 74610, magenta pigment Pigment Red 81:3 having a Color Index Constitution Number of 45160:3, Yellow 17 having a Color Index Constitution Number of 21105, and carbon black. The colorants, pigment, dye or mixtures thereof selected are present in various effective amounts, such as from about 1 to about 65, and more specifically, from about 2 to about 45 weight percent of the toner.

Surfactants in effective amounts of, for example, 0.01 to about 15 weight percent of the reaction mixture in embodiments include, for example, nonionic surfactants, such as dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ in effective amounts of, for example, from about 0.1 to about 10 percent by weight of the reaction mixture; anionic surfactants such as, for example, sodium dodecylsulfate (SDS), sodium dodecylbenzene sulfonate, sodium tetrapropyl diphenyloxide disulfonate, sodium dodecylnaphthalene sulfate, dialkyl benzenealkyl sulfates and sulfonates, abitic acid, available from Aldrich, NEOGEN RT™, NEOGEN SC™ obtained from Kao, DOWFAX 2A1™ obtained from Dow, and the like, in effective amounts of, for example, from about 0.01 to about 10 percent by weight; cationic surfactants, such as, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quatemized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is in the range of from about 0.5 to about 4.

Examples of the surfactant, which may be added to the aggregates before coalescence is initiated, include anionic surfactants, such as sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. They can also be selected from nonionic surfactants, such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective amount of the anionic or nonionic surfactant utilized in the coalescence to primarily stabilize the aggregate size against further growth with temperature is, for example, from about 0.01 to about 10 percent by weight, and preferably from about 0.5 to about 5 percent by weight of monomers used to prepare the copolymer resin.

Surface additives that can be added to the toner compositions after washing or drying include, for example, metal salts, metal salts of fatty acids, colloidal silicas, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa in amounts of from 0.1 to 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. Also, there can be selected as carrier particles, or components a core with a coating thereover of polymethylmethacrylate with a conductive component dispersed therein, such as a conductive carbon black.

Imaging methods are also envisioned with the toners of the present invention, reference for example a number of the patents mentioned herein, and U.S. Pat. No. 4,265,990, the disclosure of which is totally incorporated herein by reference.

The following Examples are being submitted to further illustrate various species of the present invention. These Examples are intended to be illustrative only and are not intended to limit the scope of the present invention.

EXAMPLE I

Yellow Encapsulated Pigment Synthesis

A yellow pigment encapsulated with a polymer and comprised of a yellow pigment core and a styrene/n-butyl acrylate/2-carboxyethyl acrylate terpolymer shell was synthesized by a semicontinuous, miniemulsion polymerization process. 1-Dodecanethiol, with a solubility in water of $3.0\times10^{-5}$ grams per liter of water at 25° C., was used as a cosurfactant and as a primary chain transfer agent. In a 2 liter jacketed glass reactor with a stirrer set at 300 rpm, 5.3 grams of DOWFAX 2A1™ (sodium tetrapropyl diphenyloxide disulfonate, 47 percent active, Dow Chemical), 1.9 grams of ANTAROX CA-897™ (70 percent active, octylphenol aromatic ethoxylate, Rhone-Poulenc), and 756 grams of deionized water were deaerated for 30 minutes while the temperature was raised to 80° C. A miniemulsion was prepared by homogenizing a monomer mixture (290 grams of styrene, 97 grams of n-butyl acrylate, 23.2 grams of 2-carboxyethyl acrylate, 1.9 grams of 2,2'-azobis(2-methylbutyronitrile), 15.5 grams of 1-dodecanethiol, and 65 grams of Yellow 17 pigment with an aqueous solution, 1.3 grams of DOWFAX 2A1™, 0.4 gram of ANTAROX CA-897™, 3.9 grams of ammonium persulfate, and 224 grams of deionized water via VirTishear Cyclone Homogenizer at 10,000 rpm for 30 minutes at room temperature, about 25° C. throughout the Examples. The miniemulsion was fed into the reactor over a period of 105 minutes. At the conclusion of the monomer feed, the emulsion was post-heated at 80° C. for 30 minutes, then there was added an initiator aqueous solution (1.9 grams of ammonium persulfate and 20 grams of deionized water). After the above initiator addition was completed, the reaction was allowed to post react for 90 minutes at 80° C., then cooled to 25° C. The resulting encapsulated yellow pigment product contained 30 percent solids comprised of a poly(styrene-butyl acrylate-2-carboxyethyl acrylate) shell or coating and Yellow Pigment 17 core, and which product possessed an average particle size of 403 nanometers as measured by light scattering technique on a Coulter N4 Plus Particle Sizer. More specifically, resulting yellow encapsulated pigment was comprised of a Yellow Pigment 17 core, about 12 percent by weight, and a poly(styrene-butyl acrylate-2-carboxyethyl acrylate) polymer shell, about 88 percent by weight, wherein the polymer shell possessed an average thickness of about 80 nanometers, which was determined by transmission electron microscope image analysis of a thin section of the yellow pigment encapsulated polymer particle. The polymer possessed an $M_w$ of 30,000, an Mn of 6,600, as determined on a Waters GPC, and a mid-point Tg of 54.0° C., as measured on a Seiko DSC.

EXAMPLE IA

Yellow Toner Preparation

295 Grams of the encapsulated yellow pigment product of Example I, 50 grams of a Yellow Pigment 17 aqueous dispersion (32.5 percent active), and 3 grams of cationic surfactant SANIZOL B-50™ were simultaneously added to 540 milliliters of water with high shear stirring at 7,000 rpm for 5 minutes, which stirring was accomplished by means of a polytron. The resulting mixture was then transferred to a 2 liter reaction vessel and heated at a temperature of 47° C. for 2 hours before 26 milliliters of 20 percent aqueous BIOSOFT D-40™ solution (sodium dodecyl benzene sulfonate, available from Stepan) were added. Subsequently, the resulting mixture was heated to 93° C. and held there for a period of 4 hours before cooling down to room temperature, about 25° C. throughout, filtered, washed with water, and dried in a freeze dryer. The final toner product evidenced a particle size of 6.4 microns in volume average diameter with a particle size distribution of 1.20 as measured on a Coulter Counter. The resulting yellow toner was comprised of about 75 percent of Yellow Pigment 17 encapsulated with the polymer poly(styrene-butyl acrylate-2-carboxyethyl acrylate), and Yellow Pigment 17, about 25 percent by weight of the toner, and wherein the total amount of the toner components was about 100 percent. The resulting yellow toner possessed a projection efficiency of about 89 percent, as measured by the Match Scan II spectrophotometer available from Milton-Roy.

EXAMPLE IB

Yellow Toner Preparation

280 Grams of the encapsulated yellow pigment product of Example I, 65 grams of a Yellow Pigment 17 aqueous dispersion (32.5 percent active), and 3 grams of cationic surfactant SANIZOL B-50™ were simultaneously added to 540 milliliters of water with high shear stirring at 7,000 rpm for 6 minutes, which stirring was accomplished by means of a polytron. The resulting mixture was then transferred to a 2 liter reaction vessel and heated at a temperature of 28° C. for 1.5 hours before 30 milliliters of 20 percent aqueous BIOSOFT D-40™ solution (sodium dodecyl benzene sulfonate, available from Stepan) were added. Subsequently, the resulting mixture was heated to 93° C. and held there for a period of 4 hours before cooling down to room temperature, filtered, washed with water, and dried in a freeze dryer. The final toner product evidenced a particle size of 3.3 microns in volume average diameter with a particle size distribution of 1.21 as measured on a Coulter Counter. The resulting yellow toner was comprised of about 70 percent Yellow Pigment 17 coated with the polymer poly(styrene-butyl acrylate-2-carboxyethyl acrylate), and Yellow Pigment 17, about 30 percent by weight of the toner, and wherein the total amount of the toner components was about 100 percent. The resulting yellow toner possessed a projection efficiency of about 87 percent, as measured by the Match Scan II spectrophotometer available from Milton-Roy.

EXAMPLE II

Cyan Encapsulated Pigment Preparation

An encapsulated cyan pigment polymer particle comprised of a cyan pigment core and a styrene/n-butyl acrylate/2-carboxyethyl acrylate terpolymer shell was synthesized by a semicontinuous, miniemulsion polymerization process. 1-Dodecanethiol, with a solubility in water of $3\times10^{-5}$ grams per liter of water at 25° C., was selected as a cosurfactant for the miniemulsion and as a primary chain transfer agent for polymer molecular weight regulation. In a 2 liter jacketed glass reactor with a stirrer set at 300 rpm, 5.3 grams of DOWFAX 2A1™ (sodium tetrapropyl diphenyloxide disulfonate, 47 percent active, Dow Chemical), 1.9 grams of ANTAROX CA-89™ (70 percent active, octylphenol aromatic ethoxylate, Rhone-Poulenc), and 765 grams of deionized water were deaerated for 30 minutes while the temperature was raised to 80° C. A miniemulsion was prepared by homogenizing a monomer mixture (303 grams of styrene, 101 grams of n-butyl acrylate, 24.3 grams of 2-carboxyethyl acrylate, 2 grams of 2,2'-azobis(2-methylbutyronitrile), 20.2 grams of 1-dodecanethiol, and 71.4 grams of Cyan 15:3 pigment) with an aqueous solution (1.3 grams of DOWFAX 2A1™, 0.4 gram of ANTAROX CA-897™, 4.1 grams of ammonium persulfate, and 258 grams of deionized water) via VirTishear Cyclone Homogenizer at 10,000 rpm for 30 minutes at room temperature. The miniemulsion was fed into the reactor over 115 minutes. At the conclusion of the monomer feed, the emulsion was post-heated at 80° C. for 30 minutes, then there was added an initiator aqueous solution (2 grams of ammonium persulfate and 20 grams of deionized water). After the above initiator addition was completed, the reaction was allowed to post react for 90 minutes at 80° C., then cooled to 25° C. The resulting encapsulated cyan pigment contained 30 percent solids, which solids were comprised of poly(styrene-butyl acrylate-2-carboxyethyl acrylate) shell and a Cyan Pigment 15:3 core, and which encapsulated colorant possessed an average particle size of 372 nanometers as measured by light scattering technique on a Coulter N4 Plus Particle Sizer. More specifically, the resulting encapsulated cyan pigment product was comprised of a Cyan Pigment 15:3 core, about 10 percent by weight, and a poly(styrene-butyl acrylate-2-carboxyethyl acrylate) polymer shell, about 90 percent by weight, wherein the polymer shell possessed an average thickness of about 82 nanometers, which was determined by transmission electron microscope image analysis of a thin section of the encapsulated cyan pigment product. The polymer shell possessed an $M_w$ of 30,500, an $M_n$ of 7,100, as determined on a Waters GPC, and a mid-point Tg of 53.1° C., as measured on a Seiko DSC.

EXAMPLE IIA

Cyan Toner Preparation

290 Grams of the above encapsulated cyan pigment emulsion of Example II, 45 grams of Cyan Pigment 15:3 aqueous dispersion (53 percent active), and 2.5 grams of cationic surfactant SANIZOL B-50™ were simultaneously added to 550 milliliters of water with high shear stirring at 7,000 rpm for 5 minutes by means of a polytron. The resulting mixture was then transferred to a 2 liter reaction vessel and heated at a temperature of 28° C. for 1 hour before 28 milliliters of 20 percent aqueous BIOSOFT D-40™ solution (sodium dodecyl benzene sulfonate) were added. Subsequently, the mixture was heated to 93° C. and held there for a period of 4 hours before cooling down to room temperature, about 25° C. throughout, filtered, washed with water, and dried in a freeze dryer. The final toner product evidenced a particle size of 3.5 microns in volume average diameter with a particle size distribution of 1.23 as measured on a Coufter Counter. The resulting toner, that is the above final toner product, was comprised of about 71 percent of Cyan Pigment 15:3 with a shell or coating of poly(styrene-butyl acrylate-2-carboxyethyl acrylate), and Cyan Pigment 15:3, about 29 percent by weight of toner, and wherein the total amount of the toner components was about 100 percent. The resulting cyan toner had a projection efficiency of about 91 percent, as measured by the Match Scan II spectrophotometer available from Milton-Roy.

EXAMPLE III

Green Toner Preparation

295 Grams of the encapsulated yellow pigment of Example I, 35 grams of Cyan Pigment 15:3 aqueous dispersion (53 percent active), and 3 grams of cationic surfactant SANIZOL B-50™ were simultaneously added to 550 milliliters of water with high shear stirring at 7,000 rpm for 5 minutes, which stirring was accomplished by means of a polytron. The resulting mixture was then transferred to a 2 liter reaction vessel and heated at a temperature of 48° C. for 2 hours before 30 milliliters of 20 percent aqueous BIOSOFT D-40™ solution (sodium dodecyl benzene sulfonate, available from Stepan) were added. Subsequently, the resulting mixture was heated to 93° C. and held there for a period of 4 hours before cooling down to room temperature, about 25° C. throughout, filtered, washed with water, and dried in a freeze dryer. The final toner product evidenced a particle size of 6.3 microns in volume average diameter with a particle size distribution of 1.22 as measured on a Coulter Counter. The resulting green toner was comprised of about 75 percent of Pigment 17 encapsulated within a polymer poly(styrene-butyl acrylate-2-carboxyethyl acrylate), Yellow Pigment 17, about 10 percent by weight, and Cyan Pigment 15:3, about 15 percent by weight of the toner, and wherein the total amount of the toner components was about 100 percent. The resulting green toner possessed a projection efficiency of about 93 percent, as measured by the Match Scan II spectrophotometer available from Milton-Roy.

EXAMPLE IV

Orange Toner Preparation

295 Grams of the encapsulated yellow pigment of Example I, 90 grams of Magenta Pigment 81.3 aqueous dispersion (21 percent active), and 3 grams of cationic surfactant SANIZOL B-50 were simultaneously added to 500 milliliters of water with high shear stirring at 7,000 rpm for 5 minutes, which stirring was accomplished by means of a polytron. The resulting mixture was then transferred to a 2 liter reaction vessel and heated at a temperature of 49° C. for 2 hours before 30 milliliters of 20 percent aqueous BIOSOFT D-40™ solution (sodium dodecyl benzene sulfonate, available from Stepan) were added. Subsequently, the resulting mixture was heated to 93° C. and held there for a period of 4 hours before cooling down to room temperature, about 25° C. throughout, filtered, washed with water, and dried in a freeze dryer. The final toner product evidenced a particle size of 6.5 microns in volume average diameter with a particle size distribution of 1.21 as measured on a Coulter Counter. The resulting orange toner was comprised of about 75 percent of the encapsulated colorant containing polymer poly(styrene-butyl acrylate-2-carboxyethyl acrylate), Yellow Pigment 17, about 10 percent by weight, and Magenta Pigment 81.3, about 15 percent by weight of the toner, and wherein the total amount of the toner components was about 100 percent. The resulting orange toner possessed a projection efficiency of about 90 percent, as measured by the Match Scan II spectrophotometer available from Milton-Roy.

COMPARATIVE EXAMPLE I

Polymer Latex Synthesis

A latex was prepared by the semicontinuous emulsion polymerization of styrene/butyl acrylate/2-carboxyethyl acrylate, 75/25/6 parts (by weight) as follows. A 2 liter jacketed glass flask with a stirrer set at 200 rpm, and containing 8.8 grams of DOWFAX 2A1™ (sodium tetrapropyl diphenyloxide disuffonate, 47 percent active, available from Dow Chemical), 3 grams of polyoxyethylene nonyl phenyl ether nonionic surfactant, ANTAROX CA 897™ (70 percent active, octylphenol aromatic ethoxylate, Rhone-Poulenc), and 519 grams of deionized water was purged with nitrogen for 30 minutes while the temperature was from about 25° C. to about 80° C. A monomer emulsion was prepared by homogenizing a monomer mixture (405 grams of styrene, 135 grams of n-butyl acrylate, 32.4 grams of 2-carboxyethyl acrylate, and 7.1 grams of 1-dodecanethiol) with an aqueous solution (4.4 grams of DOWFAX 2A1™, 1.5 grams of ANTAROX CA-897™, and 251 grams of deionized water) at 10,000 rpm for 5 minutes at room temperature of about 25° C. via VirTishear Cyclone Homogenizer. Forty one (41) grams of seed were removed from the monomer emulsion and added into the flask, and the flask contents were stirred for 5 minutes at 80° C. An initiator solution prepared from 8.1 grams of ammonium persulfate in 40 grams of deionized water was added to the flask mixture over 20 minutes. Stirring was continued for an additional 20 minutes to allow a seed particle formation. The remaining 795 grams of monomer emulsion were fed continuously into the reactor over 4 hours and 20 minutes. The nitrogen purge was reduced to a slow trickle to maintain a small positive pressure. After the above monomer emulsion addition was completed, the reaction was allowed to post react for 90 minutes at 80° C., then cooled to 25° C. by cool water. The resulting polymer poly(styrene-butyl acrylate-acrylic acid-2-carboxyethyl acrylate) possessed an $M_W$ of 31,200, and an $M_n$ of 8,400, as determined on a Waters GPC, and a mid-point Tg of 52.0° C., as measured on a Seiko DSC. The latex resin or polymer possessed a volume average diameter of 202 nanometers as measured by light scattering technique on a Coulter N4 Plus Particle Sizer.

COMPARATIVE EXAMPLE IA

Yellow Toner Preparation

195 Grams of the latex emulsion of Comparative Example I, 80 grams of Yellow Pigment 17 aqueous dispersion (32.5 percent active), and 3 grams of cationic surfactant SANIZOL B-50™ were simultaneously added to 600 milliliters of water with high shear stirring at 7,000 rpm for 5 minutes, which stirring was accomplished by means of a polytron. The resulting mixture was then transferred to a 2 liter reaction vessel and heated at a temperature of 470° C. for 2 hours before 26 milliliters of 20 percent aqueous BIOSOFT D-40™ solution (sodium dodecyl benzene sulfonate, available from Stepan) were added. Subsequently, the resulting mixture was heated to 93° C. and held there for a period of 4 hours before cooling down to room temperature, about 25° C. throughout, filtered, washed with water, and dried in a freeze dryer. The final toner product evidenced a particle size of 6.5 microns in volume average diameter with a particle size distribution of 1.42 as measured on a Coulter Counter. The resulting yellow toner was comprised of about 75 percent of the polymer poly(styrene-butyl acrylate-2-carboxyethyl acrylate), and Yellow Pigment 17, about 25 percent by weight of the toner, and wherein the total amount of the toner components was about 100 percent. The resulting yellow toner possessed a projection efficiency of about 63 percent, as measured by the Match Scan II spectrophotometer available from Milton-Roy.

COMPARATIVE EXAMPLE IB

Cyan Toner Preparation

185 Grams of the latex emulsion of Comparative Example I, 60 grams of Cyan Pigment 15:3 aqueous dispersion (53 percent active), and 2.5 grams of cationic surfactant SANIZOL B-50™ were simultaneously added to 640 milliliters of water with high shear stirring at 7,000 rpm for 5 minutes by means of a polytron. The resulting mixture was then transferred to a 2 liter reaction vessel and heated at a temperature of 28° C. for 1 hour before 28 milliliters of 20 percent aqueous BIOSOFT D40™ solution (sodium dodecyl benzene sulfonate, available from Stepan) were added. Subsequently, the mixture was heated to 93° C. and held there for a period of 4 hours before cooling down to room temperature, about 25° C. throughout, filtered, washed with water, and dried in a freeze dryer. The final toner product evidenced a particle size of 3.6 microns in volume average diameter with a particle size distribution of 1.37 as measured on a Coulter Counter. The resulting toner, that is the above final toner product, was comprised of about 71 percent of polymer, poly(styrene-butyl acrylate-2-carboxyethyl acrylate), and Cyan Pigment 15:3, about 29 percent by weight of toner, and wherein the total amount of the toner components was about 100 percent. The resulting cyan toner possessed a projection efficiency of about 75 percent, as measured by the Match Scan II spectrophotometer available from Milton-Roy.

TABLE 1

Particle Size Distribution and Projection Efficiency of Toner Particles

| Toner Example | Color | Pigment Loading (%) | Particle size (μm) | GSD | Projection Efficiency (%) |
|---|---|---|---|---|---|
| Example IA | Yellow | 25 | 6.4 | 1.20 | 89 |
| Example IB | Yellow | 30 | 3.3 | 1.21 | 87 |
| Example IIA | Cyan | 30 | 3.5 | 1.23 | 91 |
| Example III | Green | 25 | 6.3 | 1.22 | 93 |
| Example IV | Orange | 25 | 6.5 | 1.21 | 90 |
| Comparative Example IA | Yellow | 25 | 6.5 | 1.42 | 63 |
| Comparative Example IB | Cyan | 30 | 3.6 | 1.37 | 75 |

The particle size distribution and project efficiency evaluation for pigment loaded toners of the Examples and Comparative Examples are summarized in Table 1. As illustrated in the Table, it was found that the toner particles generated with encapsulated pigment aggregated with pigment dispersions possessed substantially narrower particle size distribution of from about 1.20 to about 1.23, and high projection efficiency of from about 87 to about 93, wherein the pigment loading is from about 25 to about 30 weight percent of the toner. In Comparative Examples IA and IB, the toner possessed substantially wider particle size distribution of from about 1.37 to about 1.42, and low projection efficiency of from about 63 to about 75. This indicates that the polymer encapsulated pigment particles aggregated with a pigment dispersion at a high pigment loading can provide narrow toner particle size distribution and high projection efficiency.

Other embodiments and modifications of the present invention may occur to those skilled in the art subsequent to a review of the information presented herein; these embodiments and modifications, as well as equivalents thereof, are also included within the scope of this invention.

What is claimed is:

1. A process comprising aggregating an encapsulated colorant with colorant particles, and wherein said encapsulated colorant is generated by a miniemulsion polymerization; and wherein the encapsulated colorant and the colorant particles are carbon black, magnetite, cyan, yellow, magenta, or mixtures thereof.

2. A process in accordance with claim 1 wherein said encapsulated colorant is generated by the emulsion polymerization of a colorant and a monomer, wherein a miniemulsion of said monomer is generated, and wherein the miniemulsion contains subsequent to polymerization a colorant core and a polymer shell, and which miniemulsion is generated in the presence of an ionic surfactant, a cosurfactant, and a nonionic surfactant, and wherein the monomer in said miniemulsion is of a diameter of from about 100 to about 1,000 nanometers; and wherein said colorant is encapsulated in the polymer generated by said polymerization.

3. A process in accordance with claim 2 wherein the polymer is selected from the group consisting of poly (styrene-alkyl acrylate), poly(styrene-1,3-diene), poly (styrene-alkyl methacrylate), poly(styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(alkyl methacrylate-2-carboxyethyl acrylate), poly(styrene-alkyl acrylate-2-carboxyethyl acrylate), poly(styrene-alkyl acrylate-acrylonitrile-2-carboxyethyl acrylate), poly(styrene-1,3-diene-acrylonitrile-2-carboxyethyl acrylate), and poly(alkyl acrylate-acrylonitrile-2-carboxyethyl acrylate); and wherein said polymer is optionally present in an amount of from about 35 percent by weight to about 99 percent by weight of toner.

4. A process in accordance with claim 2 wherein the miniemulsion monomer is a latex, and wherein subsequent to polymerization by heating there results a polymer selected from the group consisting of poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly (styrene-butyl acrylate), poly(styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly (styrene-butadiene-2-carboxyethyl acrylate), poly(styrene-butadiene-acrylonitrile-2-carboxyethyl acrylate), poly (styrene-butyl acrylate-2-carboxyethyl acrylate), and poly (styrene-butyl acrylate-acrylonitrile-2-carboxyethyl acrylate).

5. A process in accordance with claim 2 wherein the ionic surfactant is an anionic surfactant selected from the group consisting of sodium dodecyl sulfate, sodium dodecylbenzene sulfate, sodium dodecylnaphthalene sulfate, and sodium tetrapropyl diphenyloxide disulfonate, and wherein the colorant core is a dispersion containing a cationic surfactant of a quaternary ammonium salt.

6. A process in accordance with claim 2 wherein toner particles are isolated and are from about 2 to about 10 microns in volume average diameter, and the particle size distribution GSD thereof is from about 1.15 to about 1.30, wherein each of the surfactants utilized represents from about 0.01 to about 5 weight percent of the total reaction mixture, and wherein there is added to the surface of the formed toner metal salts, metal salts of fatty acids, silicas, metal oxides, or mixtures thereof, each in an amount of from about 0.1 to about 10 weight percent of the obtained toner particles, and wherein the monomer in said miniemulsion is of a diameter of from about 200 to about 600 nanometers.

7. A process in accordance with claim 2 wherein said polymer is poly(styrene-alkyl acrylate-acrylic acid), poly (styrene-1,3-diene-acrylic acid), or poly(styrene-alkyl acrylate-2-carboxyethyl acrylate).

8. A process in accordance with claim 2 wherein said polymer is poly(styrene-butyl acrylate-acrylic acid), poly (styrene-butyl acrylate-2-carboxyethyl acrylate), or poly (styrene-butadiene-acrylic acid).

9. A process in accordance with claim 1 wherein said aggregating is accomplished below about the polymer glass transition temperature followed by coalescing or fusing, and wherein said coalescing or fusing of said aggregates is accomplished above about the polymer glass transition temperature, and wherein said monomer diameter is from about 200 to about 600 nanometers, and there results a toner with a size of from about 2 to about 25 microns in volume average diameter.

10. A process in accordance with claim 9 wherein said temperature below the glass transition temperature is from about 25° C. to about 60° C., and the temperature above the glass transition temperature is from about 60° C. to about 100° C.

11. A process in accordance with claim 9 wherein said temperature below the glass transition temperature is from about 35° C. to about 55° C., and the temperature above the glass transition temperature is from about 70° C. to about 95° C.; and wherein the temperature at which said aggregation is accomplished controls the size of the aggregates, and wherein the final toner size is from about 2 to about 10 microns in volume average diameter, and wherein the temperature and time of said coalescence or fusion of the components of aggregates control the shape of the resultant toner.

12. A process in accordance with claim 9 wherein the aggregation temperature is from about 20° C. to about 55° C., and wherein the coalescence or fusion temperature is from about 80° C. to about 95° C.

13. A process in accordance with claim 1 wherein the colorant is a pigment, and wherein there is formed a pigment dispersion containing an ionic surfactant, and the miniemulsion is a latex containing a nonionic surfactant and an ionic surfactant of opposite charge polarity to that of said ionic surfactant present in a pigment dispersion, and wherein said colorant particles are comprised of pigment particles.

14. A process in accordance with claim 1 wherein the encapsulated colorant and colorant particles are dissimilar.

15. A process in accordance with claim 1 wherein the encapsulated colorant and colorant particles are similar.

16. A process comprising aggregating an encapsulated colorant with colorant particles, and wherein said encapsulated colorant is generated by a miniemulsion polymerization, and wherein during said miniemulsion a cosurfactant is present, and wherein the encapsulated colorant and colorant particles are carbon black, magnetite, cyan, yellow, or mixtures thereof.

17. A process in accordance with claim 16 wherein the cosurfactant is an alkane with from about 10 to about 24 carbon atoms, and wherein said alkane is present in an amount of from about 0.05 to about 5 percent by weight.

18. A process in accordance with claim 17 wherein the alkane is n-decane, dodecane, tetradecane, hexadecane, octadecane octyne, dodecyl cyclohexane, or hexadecyl benzene.

19. A process in accordance with claim 16 wherein the cosurfactant is an alcohol, or an alkyl thiol.

20. A process in accordance with claim 19 wherein the alcohol contains from about 10 to about 20 carbon atoms.

21. A process in accordance with claim 19 wherein the alcohol is decanol, lauryl alcohol, tetradecanol, cetyl alcohol, or octadecanol.

22. A process in accordance with claim 19 wherein the alcohol is present in an amount of from about 0.1 to about 5 weight percent.

23. A process in accordance with claim 19 wherein the alkyl thiol contains from about 10 to about 18 carbon atoms, and wherein from the alkyl thiol is present in an amount of from about 0.1 to about 5 weight percent.

24. A process in accordance with claim 19 wherein the alkyl thiol is decanethiol, 1-dodecanethiol, t-dodecanethiol, or octadecanethiol.

25. A process in accordance with claim 16 wherein said cosurfactant is selected from the group consisting of alkanes, alcohols, ethers, alkyl thiols, amines, halides, and esters.

26. A process in accordance with claim 25 wherein said cosurfactant is present in an amount of from about 1 to about 3 weight percent.

27. A process for the preparation of toner which comprises aggregating colorant particles and an encapsulated colorant containing a polymer shell, an ionic surfactant, a cosurfactant, and a nonlonic surfactant;

coalescing the aggregates generated;

isolating, washing, and drying the toner; and wherein the encapsulated colorant and the colorant particles are carbon black, magnetite, cyan, yellow, magenta, or mixtures thereof.

* * * * *